United States Patent
Whitton

(10) Patent No.: US 7,056,263 B2
(45) Date of Patent: Jun. 6, 2006

(54) ELECTRONIC CLUTCH-TO-CLUTCH TRANSMISSION CONTROL SYSTEM

(75) Inventor: Matthew D. Whitton, Howell, MI (US)

(73) Assignee: General Motors Corporation, Detroit, MI (US)

( * ) Notice: Subject to any disclaimer, the term of this patent is extended or adjusted under 35 U.S.C. 154(b) by 514 days.

(21) Appl. No.: 10/317,554

(22) Filed: Dec. 12, 2002

(65) Prior Publication Data

US 2004/0116250 A1 Jun. 17, 2004

(51) Int. Cl.
*F16H 61/00* (2006.01)

(52) U.S. Cl. .................. 477/143; 477/154; 475/125; 701/67

(58) Field of Classification Search ............... 477/143, 477/154, 155; 74/339; 475/123, 125, 127; 701/67
See application file for complete search history.

(56) References Cited

U.S. PATENT DOCUMENTS

| | | | | |
|---|---|---|---|---|
| 5,304,102 A | * | 4/1994 | Narita et al. ............... 475/125 |
| 5,368,531 A | * | 11/1994 | Ando et al. .................. 477/143 |
| 5,779,594 A | * | 7/1998 | Minowa et al. ............. 477/154 |
| 6,243,637 B1 | * | 6/2001 | Minowa et al. ............... 701/51 |
| 6,334,833 B1 | * | 1/2002 | Ochi et al. ................... 477/143 |
| 6,503,165 B1 | * | 1/2003 | Kubo et al. ................. 477/143 |
| 2001/0016539 A1 | * | 8/2001 | Yuasa et al. ................. 477/143 |

* cited by examiner

*Primary Examiner*—Charles A. Marmor
*Assistant Examiner*—Eric M. Williams
(74) *Attorney, Agent, or Firm*—Christopher DeVries

(57) ABSTRACT

A transmission system includes a first clutch, a second clutch, and a controller. The controller communicates with the first and second clutches and commands a gear shift. The controller calculates a torque phase time for the gear shift and determines a desired torque trajectory within said torque phase time. The controller determines on-coming torque values for the second clutch and off-going torque values for the first clutch to achieve the desired torque trajectory within the torque phase time. The controller calculates an on-coming clutch pressure based on the on-coming torque value, and an off-going clutch pressure based on the off-going torque value. The controller delays actuation of the first and second clutches to compensate for hydraulic delays.

22 Claims, 4 Drawing Sheets

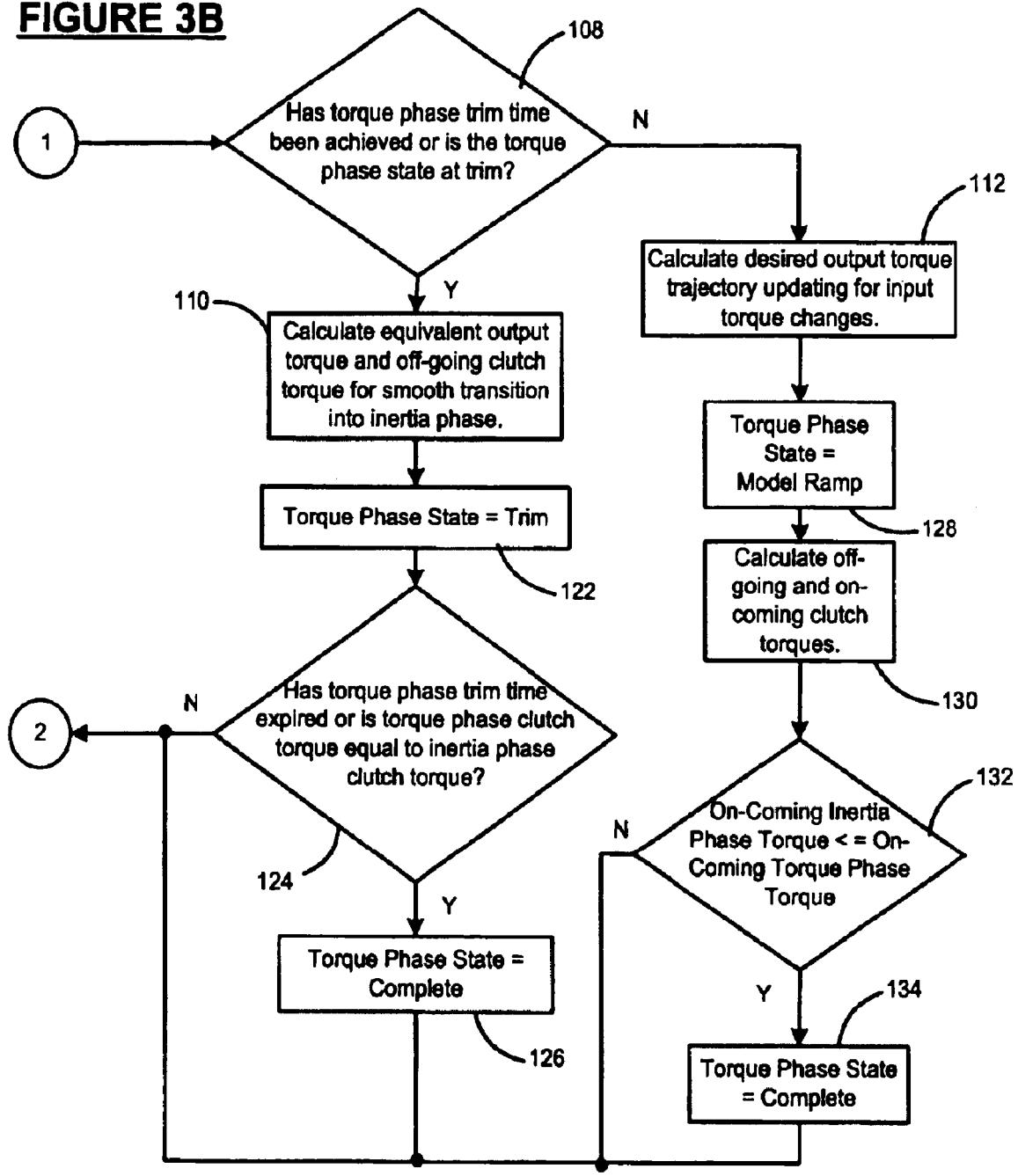

ELECTRONIC CLUTCH-TO-CLUTCH TRANSMISSION CONTROL SYSTEM

TECHNICAL FIELD

The present invention relates to transmission systems, and more particularly to a transmission system with improved clutch-to-clutch shift control.

BACKGROUND OF THE INVENTION

Automatic transmissions include a plurality of gears and associated components that are manipulated to drive an output shaft using different gear ratios. A transmission controller monitors vehicle operating conditions and driver input to determine whether an up-shift or a down-shift should occur. During a shift, an on-coming component gradually engages the next gear as an off-going component gradually disengages the present gear.

Traditionally, a one-way clutch or diode is implemented as an off-going component to transfer torque through the powertrain. The release of the off-going component is controlled based upon the rate of the on-coming component during the shift. Conventional transmission systems use compliance devices, such as accumulators, wave plates, and orifices, and hydraulic line pressure to control shift feel. However, this configuration is overly complex, increases cost, and requires a large packaging envelope within the transmission.

SUMMARY OF THE INVENTION

A transmission system according to the present invention includes a first clutch, a second clutch, and a controller. The controller communicates with the first and second clutches and commands a gear shift. The controller calculates a torque phase time for the gear shift and determines a desired torque trajectory within said torque phase time. The controller determines on-coming torque values for the second clutch and off-going torque values for the first clutch to achieve the desired torque trajectory within the torque phase time.

In other features, the first clutch selectively interconnects an input shaft to an output shaft through a first gear. The second clutch selectively interconnects the input shaft to the output shaft through a second gear. The first and second gears respectively provide first and second gear ratios.

In another feature, the controller calculates a desired torque of an output shaft. The desired torque trajectory is based on the desired torque.

In yet another feature, the controller calculates an on-coming clutch pressure based on the on-coming torque value, and an off-going clutch pressure based on the off-going torque value. The controller delays actuation of the first and second clutches to compensate for hydraulic delays.

In still other features, the on-coming and off-going torque values are based on an input torque, a rotational speed of a torque converter turbine, and an output torque of an output shaft.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIGS. 3A and 3B illustrate a flowchart detailing a transmission shift control method of the present invention.

DESCRIPTION OF THE PREFERRED EMBODIMENT

Figure 1:
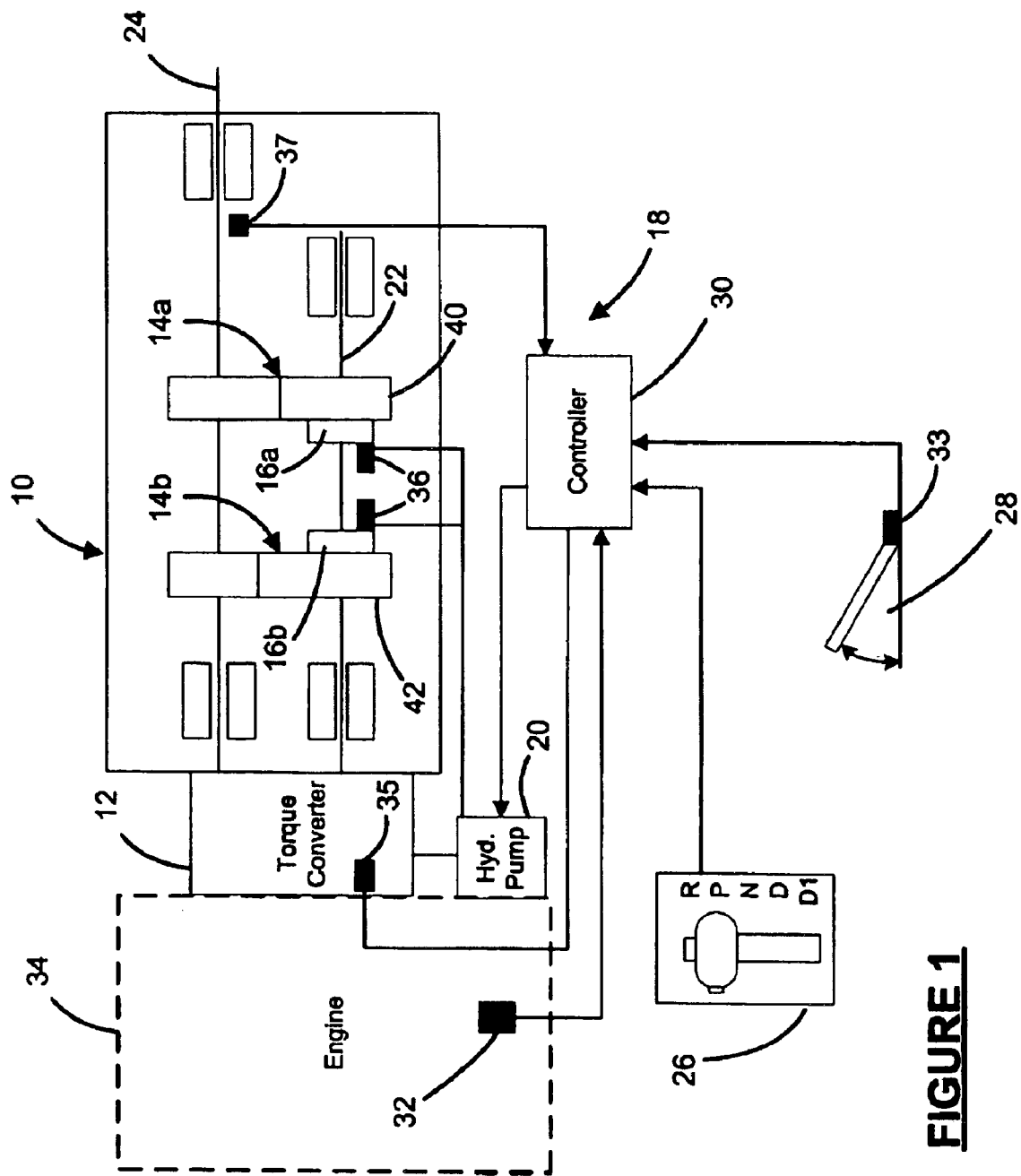
FIG. 1 is a functional block diagram of an exemplary vehicle transmission system according to the present invention.

The following description of the preferred embodiment is merely exemplary in nature and is in no way intended to limit the invention, its application, or uses. For purposes of clarity, the same reference numbers will be used in the drawings to identify similar components.

Referring now to FIG. 1, an exemplary automatic transmission 10 includes a torque converter 12, a plurality of gear sets 14a, 14b, hydraulically-actuated multiple clutches 16a, 16b, a transmission control system 18, and a hydraulic pump 20. The hydraulic pump 20 may be driven by the engine or an electric motor. The torque converter 12 enables start-off, provides torque multiplication, and absorbs harmonic vibrations within the vehicle drivetrain.

The gear sets 14a, 14b are located between an input shaft 22, which is connected to the torque converter 12, and an output shaft 24. The gear sets 14a, 14b enable the output shaft 24 to be driven at multiple gear ratios. The transmission control system 18 selectively engages the multiple clutches 16a, 16b. The hydraulic pump 20 supplies hydraulic fluid pressure for valve body and shift components and/or for the torque converter 12.

The transmission control system 18 defines gear selection and shift points and regulates demand-response shifting. Demand-response shifting is based on a shift program that is selected by the driver using a selector 26, a position of an accelerator 28, engine operating conditions, and/or vehicle speed. The transmission control system 18 is generally a combined hydraulic and electric system. The transmission control system 18 hydraulically actuates the clutches 16a, 16b. The transmission control system 18 actuates gear selection and modulates the clutch pressure electronically in accordance with the torque flowing through the transmission 10.

The transmission control system 18 includes a controller 30 that communicates with a plurality of sensors. A speed sensor 32 monitors engine speed and a position sensor 33 monitors selector-lever position. Load sensors 35 and speed sensor 37 monitor the torque converter load and the rotational speed of the output shaft 24, respectively. The controller 30 adjusts analog or digital pressure regulators 36 to control clutch pressure.

Shift-quality depends upon the accuracy that the pressure of the clutches 16a, 16b is adjusted to the level of torque transmitted. The level of torque transmitted is estimated based on engine load and output shaft speed. As the automatic transmission shifts gear ratios, one clutch gradually disengages (i.e., is off-going) as another clutch gradually engages (i.e., is on-coming). The decrease and increase of pressure of the off-going and on-coming clutches, respectively, determines the operator's feel.

Shifting between gear ratios occurs in two distinct phases: a torque phase and an inertia phase. During the torque phase, the speed of the input shaft 22 from the torque converter 12 remains constant. During the inertia phase, there is a response to the shift and the input shaft 22 changes speed. For an up-shift, the speed is decreased. For a down-shift, the speed is increased.

In operation, a first gear 40 of the first gear set 14a is initially coupled to the input shaft 22 to drive the output shaft 24 at a first gear ratio. When an up-shift is signaled by the controller 30, the clutch 16a gradually decreases engagement of the first gear 40 with the input shaft 22 (i.e., is off-going). The second clutch 16b gradually increases engagement of a second gear 42 of the second gear set 14b with the input shaft 22 (i.e., is on-coming). Eventually, the first clutch 16a completely disengages the first gear 40 from the input shaft 22 and the second clutch 16b couples the second gear 42 with the input shaft 22 to drive the output shaft 24 at a second gear ratio.

Figure 2:
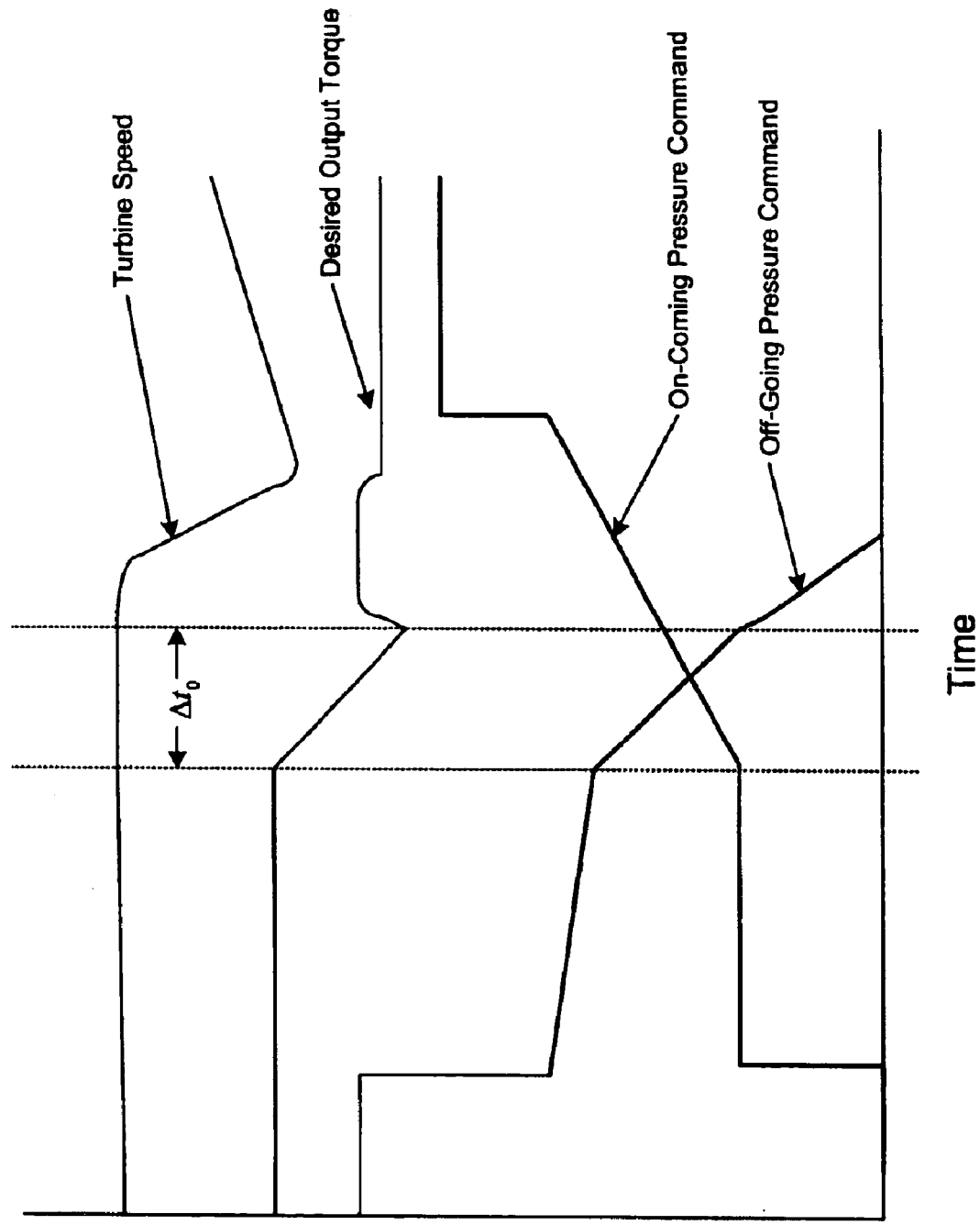
FIG. 2 is a graph depicting parameter values during an up-shift of an automatic transmission according to the present invention.

Referring now to FIG. 2, the present invention provides a transmission shift control method that calculates the required clutch pressure commands during the torque phase of an up-shift. The transmission shift control method avoids flare and overlap and improves shift quality. Generally, the transmission shift control method employs the following off-going torque ($T_{off}$) and on-coming torque ($T_{on}$) equations:

$$T_{off}=aT_o+bT_i+c\eta_t$$

$$T_{on}=dT_o+eT_i+f\eta_t$$

The equations determine the clutch torques that are necessary to achieve a desired output torque trajectory for a given input torque and torque converter turbine acceleration. In the equations, $T_o$ is the output torque of the transmission output shaft 24. $T_i$ is the torque from the torque converter and $\eta_t$ is the input shaft acceleration. The values a, b, c, d, e, and f are theoretical constants for each shift type (i.e., on or off). Exemplary values for these constants are provided in Table 1 below for an exemplary six-speed automatic transmission.

TABLE 1

| Calibration | Up-shift | | | | |
|---|---|---|---|---|---|
| Value | 1st to 2nd | 2nd to 3rd | 3rd to 4th | 4th to 5th | 5th to 6th |
| a | 1.42 | −1.00 | −1.46 | 1.50 | −2.2979 |
| b | −1.6359 | 1.5319 | 1.2441 | −3.5464 | 1.5319 |
| c | 0.0156 | −0.01 | −0.0157 | 0.0196 | −0.0265 |
| d | −1.88 | −0.6479 | −1.42 | −0.5 | −1.7979 |
| e | 2.88 | 1.5319 | 1.6359 | 2.0145 | 1.5319 |
| f | −0.0233 | −0.0091 | −0.0193 | −0.0113 | −0.0228 |

As can be appreciated, the constants will vary depending upon the particular transmission type that is used.

Using the calculated torques, the transmission control system 18 determines a desired torque phase time based on a driver's input. For example, if the driver fully depresses the accelerator 28, the desired torque phase time will reflect a wide-open throttle (WOT) condition. The determination of the desired torque phase time also depends upon pre-programmed calibration parameters. Using the desired torque phase time, a desired output torque trajectory is calculated. On-coming and off-going torque commands are calculated based on the desired output torque trajectory. The on-coming and off-going torque commands are delayed for hydraulic delays in the transmission 10 to provide a seamless clutch torque exchange prior to a speed change.

Figure 3A:
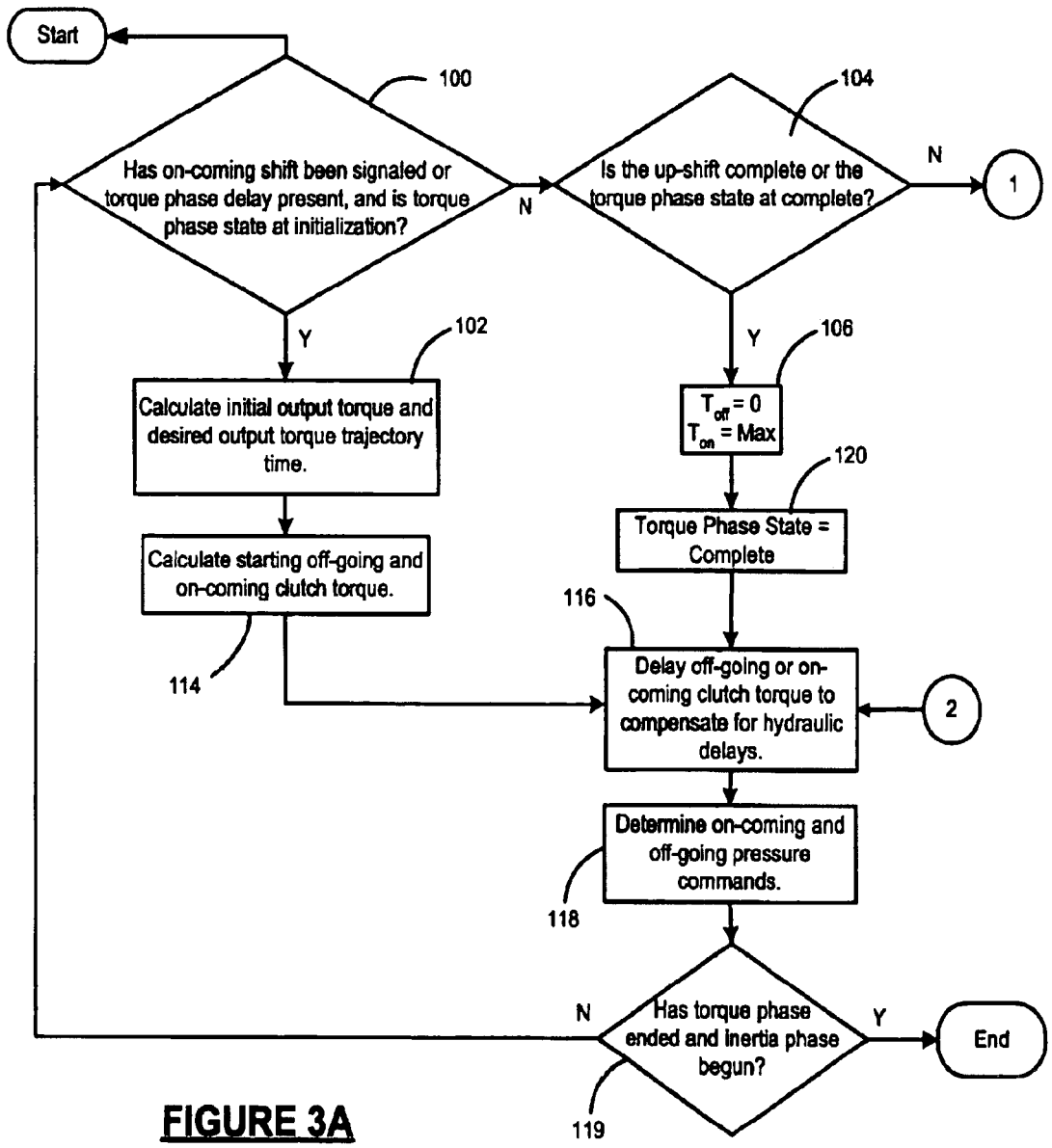

Referring now to FIGS. 3A and 3B, the up-shift control of the present invention will be described in detail. Generally, the up-shift torque phase includes four states: initialization, updating, trimming to inertia phase, and completion. The up-shift control determines the torque phase state and the torque phase pressure commands.

After the start step, the up-shift control determines whether the on-coming shift has been signaled or whether a torque phase delay is present, and whether the torque phase state is at initialization in step 100. If true, the up-shift control continues with step 102 and calculates the desired shift parameters. Otherwise, the up-shift control continues with step 104. In step 104, the up-shift control determines whether either the on-coming shift or the torque phase state are complete. If either is complete, the up-shift control continues with step 106. Otherwise, the control continues with step 108.

In step 108, the up-shift control determines whether a torque phase trim initialization time has been reached or whether the torque phase state is at trim. The trim state is indicative of the transition between the torque and the inertia phases. The trim initialization time is determined as a percent of the torque phase time. For example, if the torque phase time is 300 ms, a pre-programmed calibration value sets the trim initialization time to 75% or 225 ms. Once the torque phase achieves the 225 ms point, trimming is initialized. If the torque phase trim initialization time has been reached or the torque phase state is at trim, the up-shift continues with step 110 to trim the torque phase. Otherwise, the up-shift control continues with step 112. In step 112, the up-shift control updates the desired output torque trajectory for changes occurring during the torque phase of the up-shift.

In step 102, the up-shift control calculates the initial output torque and the desired output torque trajectory time ($\Delta t_o$) (see FIG. 2) based on the present gear ratio and input torque. In step 114, the up-shift control calculates the off-going and on-coming torques of the active clutches using the equations described above. Once the off-going and on-coming torques have been calculated, a respective delay to the ultimate output to the solenoid drivers is initiated to compensate for hydraulic delays in step 116. In step 118 the pressures applied to actuate the off-going and on-coming clutches are determined. After determining the pressures in step 118, the controller determines whether the torque phase has ended and the inertia phase has started. If the torque phase has ended, up-shift control ends. If the torque phase has not ended, up-shift control loops back to step 100.

In step 104, the up-shift control determines whether either the on-coming stage or the torque phase state of the up-shift is complete. In other words, the controller determines whether the up-shift has been completed so that the on-coming clutch can be fully engaged and the off-going clutch can be fully disengaged. In step 106, control commands $T_{off}$ to zero and $T_{on}$ to maximum. In step 120, the up-shift control flags the torque phase state as being complete if not flagged previously. The up-shift control continues with steps 116, 118 and 119.

In step 108, the up-shift control determines whether either a torque phase trim initialization time has been reached or the torque phase state is at trim. In step 110, a time interpolation of the on-coming torque phase clutch torque to the inertia phase clutch torque. In other words, the on-coming torque phase clutch torque is ramped to achieve the commanded inertia phase clutch torque over the trimming period. The equations are then used to back-calculate equivalent output torque and off-going clutch torque to smoothly transition into the inertia phase. In step 122, the torque phase state is set to trim. In step 124, the up-shift control determines whether a torque phase trim time has expired or whether the torque phase clutch torque is equivalent to an inertia phase clutch torque. If either is true, the up-shift control continues with step 126 and declares the torque phase state complete. If neither is true, the up-shift control continues with steps 116, 118 and 119. Once the torque phase state is declared complete in step 126, the up-shift control continues with steps 116, 118 and 119.

In step 112, the desired output torque trajectory is updated for input torque changes resulting from a driver's intent. For example, during the torque phase, a driver may either increase or decrease pressure on the accelerator pedal to alter the input torque. In step 128, the torque phase state is set to model ramp. In this state, the controller 30 continuously calculates the on-coming and off-going torques to achieve the desired torque trajectory. In step 130, the on-coming and off-going torques are calculated based on the present operating conditions according to the equations provided above. In step 132, the up-shift control determines whether a pre-programmed on-coming inertia phase torque is less than or equal to the calculated torque phase on-coming torque. In this manner, completion of the torque phase is determined. If the on-coming inertia phase torque is less than or equal to the calculated torque phase on-coming torque then the up-shift control continues with step 134 and declares the torque phase state complete. Otherwise the up-shift control continues with steps 116, 118 and 119 described in detail above.

The up-shift control of the present invention enables calibration of torque phase times and system control to dynamically determine the on-coming and off-going clutch pressures. As a result, a desired torque trajectory or profile can be readily achieved and system calibration effort is reduced. Further, the up-shift control allows adaptive learning to improve shift quality over time. Overall, the up-shift control enables improved shift quality and feel while minimizing hardware complexity and size.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A transmission system comprising:
   a first clutch;
   a second clutch;
   a controller that communicates with said first and second clutches, that commands a gear shift, that calculates a torque phase time for said gear shift, that determines a desired torque trajectory within said torque phase time, and that determines on-coming torque values for said second clutch and off-going torque values for said first clutch to achieve said desired torque trajectory within said torque phase time; and
   wherein said on-coming and off-going torque values are based on an input torque, a rotational speed of a torque converter turbine, and an output torque of an output shaft.

2. The transmission system of claim 1 wherein said first clutch selectively interconnects an input shaft to an output shaft through a first gear that provides a first gear ratio and said second clutch selectively interconnects said input shaft to said output shaft through a second gear that provides a second gear ratio.

3. The transmission system of claim 1 wherein said controller calculates a desired torque of an output shaft and wherein said desired torque trajectory is based on said desired torque.

4. The transmission system of claim 1 wherein said controller further calculates an on-coming clutch pressure based on said on-coming torque value, and an off-going clutch pressure based on said off-going torque value.

5. The transmission system of claim 4 wherein said controller delays actuation of said first and second clutches to compensate for hydraulic delays.

6. A method of shift control comprising:
   determining an output torque of an automatic transmission;
   determining a torque phase time for a shifting period;
   determining a desired output torque trajectory within said torque phase time;
   calculating on-coming torque values of an engaging clutch and off-going torque values of a disengaging clutch to achieve said output torque trajectory; and
   wherein said on-coming torque values are based on an output torque, an input torque, an input shaft speed, and a plurality of theoretical constants.

7. The method of claim 6 further comprising:
   determining on-coming pressure commands based on said on-coming torque values; and
   determining off-going pressure commands based on said off-going torque values.

8. The method of claim 7 further comprising delaying said step of determining said on-coming and off-going pressure commands for a predetermined period of time.

9. The method of claim 7 wherein said on-coming pressure commands and said off-going pressure commands are determined from a look-up table.

10. The method of claim 7 wherein said on-coming pressure commands and said off-going pressure commands are calculated by respective clutch gain equations having an adapted offset.

11. The method of claim 6 wherein said output torque trajectory is based on pre-programmed calibration parameters.

12. A method of shift control comprising:
    determining an output torque of an automatic transmission;
    determining a torque phase time for a shifting period;
    determining a desired output torque trajectory within said torque phase time;
    calculating on-coming torque values of an engaging clutch and off-going torque values of a disengaging clutch to achieve said output torque trajectory; and
    wherein said off-going torque values are based on an output torque, an input torque, an input shaft speed, and a plurality of theoretical constants.

13. The method of claim 6 further comprising detecting an up-shift condition.

14. A method of controlling up-shift of an automatic transmission comprising:
    determining a time period for a torque phase of an up-shift event;
    determining an output torque trajectory within said time period;
    determining on-coming pressure commands for an engaging clutch and off-going pressure commands for a disengaging clutch to achieve said output torque trajectory; and
    wherein said on-coming pressure commands are based on an output torque, an input torque, an input shaft speed, and a plurality of theoretical constants.

15. The method of claim 14 wherein said on-coming pressure commands are based on calculated on-coming torque values.

16. The method of claim 14 wherein said off-going pressure commands are based on calculated off-going torque values.

17. The method of claim 14 further comprising determining a state of said torque phase.

18. The method of claim 17 wherein when said state is complete, said off-going pressure command is set to zero, and said on-coming pressure command is set to a maximum value.

19. The method of claim 17 wherein when said state is trim, said on-coming and off-going pressure commands are interpolated to achieve a smooth transition into an inertia phase of said up-shift period.

20. The method of claim 14 further comprising delaying actuation of said engaging and disengaging clutches to compensate for hydraulic delays.

21. The method of claim 14 further comprising updating said output torque trajectory during said time period.

22. The method of claim 21 further comprising updating said on-coming and off-going pressure commands in response to said step of updating.

* * * * *